(12) United States Patent
Ruck

(10) Patent No.: US 7,337,864 B2
(45) Date of Patent: Mar. 4, 2008

(54) INDUSTRIAL TRUCK WITH A DAMPED DRIVER'S POSITION

(75) Inventor: Armin Ruck, Pliezhausen (DE)

(73) Assignee: Still Wagner GmbH & Co. KG, Reutlingen-Mittelstadt (DE)

( * ) Notice: Subject to any disclaimer, the term of this patent is extended or adjusted under 35 U.S.C. 154(b) by 545 days.

(21) Appl. No.: 10/603,574

(22) Filed: Jun. 25, 2003

(65) Prior Publication Data

US 2004/0124037 A1 Jul. 1, 2004

(30) Foreign Application Priority Data

Jun. 26, 2002 (DE) ................................ 102 28 631

(51) Int. Cl.
*B62D 33/00* (2006.01)
(52) U.S. Cl. .................... 180/89.13; 180/326; 180/327; 180/329; 296/190.04; 296/190.07
(58) Field of Classification Search ............. 180/89.13, 180/89.12, 326, 327, 329; 296/190.04, 190.07
See application file for complete search history.

(56) References Cited

U.S. PATENT DOCUMENTS

| 4,047,759 A | 9/1977 | Koscinski |
| 5,579,859 A | 12/1996 | Quellhorst et al. |

FOREIGN PATENT DOCUMENTS

| DE | 44 13 630 A1 | 10/1995 | |
| FR | 1 558 324 | 2/1969 | |
| GB | 1 440 686 | 6/1976 | |
| GB | 2 288 770 A | 11/1995 | |
| JP | 2-24277 | * 1/1990 | .............. 180/89.13 |
| WO | WO 91/04221 | 4/1991 | |

\* cited by examiner

*Primary Examiner*—Eric Culbreth
(74) *Attorney, Agent, or Firm*—The Webb Law Firm

(57) ABSTRACT

An industrial truck, such as a reach truck, has a vehicle frame (1) and a driver's station with at least one floor plate and one driver's seat (6). The floor plate and the driver's seat (6) are suspended relative to the vehicle frame (1). The floor plate and the driver's seat (6) are fastened to an intermediate frame (8), which is mounted so that it can move relative to the vehicle frame (1). At least one suspension element (10) and/or at least one damping element (11) is provided that connects the intermediate frame (8) with the vehicle frame (1). The intermediate frame (8) can move relative to the vehicle frame (1) exclusively in the vertical direction.

8 Claims, 3 Drawing Sheets

INDUSTRIAL TRUCK WITH A DAMPED DRIVER'S POSITION

CROSS-REFERENCE TO RELATED APPLICATION

This application corresponds to German Application No. 102 28 631.0, filed Jun. 26, 2002, which is herein incorporated by reference in its entirety.

BACKGROUND OF THE INVENTION

1. Field of the Invention

This invention relates to an industrial truck, in particular a reach truck, with a vehicle frame and a driver's position that comprises at least one floor plate and one seat. The floor plate and the driver's seat are suspended relative to the vehicle frame.

2. Technical Considerations

Industrial trucks of this type frequently have a suspended driver's seat. The suspension of the driver's seat prevents impacts or vibrations that act on the vehicle frame, for example of the type that can occur as a result of bumps in the road, from being transmitted in whole or in part to the seated driver. The suspended driver's seat is thereby rigidly connected with the vehicle frame by means of an unsuspended component. In some industrial trucks, a floor plate on which the seated driver places his feet and on which he stands when it is necessary to operate the industrial truck from a standing position is frequently also suspended relative to the vehicle frame. The suspension of the floor plate is thereby always independent of the suspension of the driver's seat. The weight to be suspended by means of the floor plate varies greatly, depending on whether the driver is sitting, in which case only his legs are supported on the floor plate, or whether he is standing on the floor plate with the weight of his entire body. Any possible relative movement between the driver's seat and the floor plate can have a negative effect on the ergonomics of the driver's position. The maximum suspension travel of the driver's seat and of the floor plate are therefore set to a lower value than might be desirable with regard to an optimum suspension and damping of the driver's position.

Therefore, it is an object of the invention to provide an ergonomically optimized industrial truck that has a damped driver's position.

SUMMARY OF THE INVENTION

In one aspect, the invention teaches that the floor plate and the driver's seat of an industrial truck are fastened to an intermediate frame which is mounted so that it can move relative to the vehicle frame. At least one suspension element and/or at least one damping element is provided which connects the intermediate frame with the vehicle frame. By means of the intermediate frame, the driver's seat and the floor plate are connected with each other and are mounted on the vehicle frame so that they can move jointly. A compensating movement of the floor plate by means of the suspension and/or damping element is thereby always also transmitted to the driver's seat, so that as a result of such a compensating movement, the position of the floor plate remains constant relative to a fastening point on the driver's seat. The floor plate and the pedals that are located on the floor plate thereby always remain in the optimal position relative to the driver's seat. The suspension and damping of the intermediate frame can be designed specifically for the typical operating conditions of the industrial truck. Apart from the different body weights of different drivers, the mass to be damped is always the same, regardless of the conditions under which the industrial truck is being operated.

Additional ergonomically advantageous effects can be achieved if the driver's seat is mounted suspendedly on the intermediate frame. A commercially available suspended seat can thereby be used. The suspension travel of this seat can be relatively small, in comparison to industrial trucks of the known art, because a large part of the impacts and vibrations to which the vehicle frame is subjected are already compensated for by the movable mounting of the intermediate frame.

In one configuration of the invention, at least one translation guide element is provided that connects the intermediate fame with the vehicle frame. With the translation guide elements it is possible to define the desired directions of movement of the intermediate frame relative to the vehicle frame.

For example, it may be desirable to make the intermediate frame movable in only one direction in translation relative to the vehicle frame. All other directions of movement can be prevented, for example by the translation guide element.

In one non-exclusive embodiment, the intermediate frame can be movable relative to the vehicle frame exclusively in the vertical direction. A damping and suspension of impacts therefore takes place exclusively in the direction of gravity. There is no horizontal movement of the intermediate frame relative to the vehicle frame.

In one particularly simple embodiment, the translation guide element comprises at least one roller that is guided in a profile. For this purpose, the U-shaped profiles that are used, for example, can be the same type as are used in the construction of industrial trucks for lifting platforms.

If three profiles are oriented parallel to one another, with at least one roller guided in each profile, any movement in translation and/or rotation in the plane perpendicular to the profiles can be prevented. At least two of the three profiles should, therefore, be at a significant distance from each other.

In one advantageous development of the invention, the position of the driver's seat and/or of the floor plate is adjustable relative to the intermediate frame. The positions of the driver's seat and floor plate can thereby be adjusted to respond to current conditions, in particular to the size of the driver's body. The suspension and damping of the intermediate frame and thus also of the driver's seat and of the floor plate relative to the vehicle frame are not influenced by any such adjustments.

Favorable ergonomic conditions in the driver's position can be ensured automatically if the position of the driver's seat and of the floor plate can be adjusted relative to the intermediate frame, whereby a vertical adjustment of the floor plate is coupled to a displacement of the driver's seat.

In this case, it is particularly advantageous if, for the adjustment of the driver's seat, there is a guide that is oriented from the front-top to the rear-bottom. A device of this type for the simultaneous adjustment of the driver's seat and the floor plate is described in DE 44 13 630 A1.

For the suspension of the intermediate frame relative to the vehicle frame, a particularly simple construction can be achieved if at least one metal coil spring is provided as the suspension element.

The damping of the intermediate frame can be achieved by particularly simple means if the damping element includes at least one hydraulic shock absorber. The combination of metal coil springs with hydraulic dampers represents a technology that has been used successfully in automotive construction, for example. The coil springs and dampers can be realized, for example, in the form of separate or combined assemblies. Alternatively, pneumatic struts and/or pneumatic shock absorbers can be used, to cite just two examples.

It is particularly advantageous if the suspension element and/or the damping element is configured so that a vibrating movement of the intermediate frame relative to the vehicle frame has a natural frequency between 2 and 3 Hz. A vibration of the driver's seat is experienced by the driver as particularly tolerable if the vibration frequency lies in this range. On the other hand, a vibration at a lower or higher frequency can lead to disruptions in the driver's equilibrium, or irritations to the eyes or the internal organs.

Furthermore, it is ergonomically advantageous if the suspension element and/or the damping element are configured so that an oscillating movement of the intermediate frame relative to the vehicle frame has essentially decayed after two oscillation periods. A vibration movement of the intermediate frame, which is caused, for example, when the industrial truck runs over a bump in the floor, has then decayed after approximately 2 oscillation periods to the point where the driver can no longer feel it.

For the vibration movement of the intermediate frame, a maximum amplitude can be provided that has a value between 2 and 6 cm. The maximum amplitude is defined by stops that can be located, for example, in the vicinity of the guide elements, the suspension element, or the damping element.

The arrangement taught by the invention is particularly advantageous if the industrial truck has an unsuspended chassis. This is the case with most models of industrial trucks. In particular, in trucks used in warehouse operations whose comparatively hard tires are designed to run on smooth floors, there are special requirements for the suspension and damping of the driver's position if the truck is driven, for example, over sills, rails or similar uneven spots in the floor.

BRIEF DESCRIPTION OF THE DRAWINGS

Additional advantages and details of the invention are explained in greater detail below, with reference to the exemplary embodiment illustrated in the accompanying schematic figures.

DESCRIPTION OF THE PREFERRED EMBODIMENT

Figure 1:
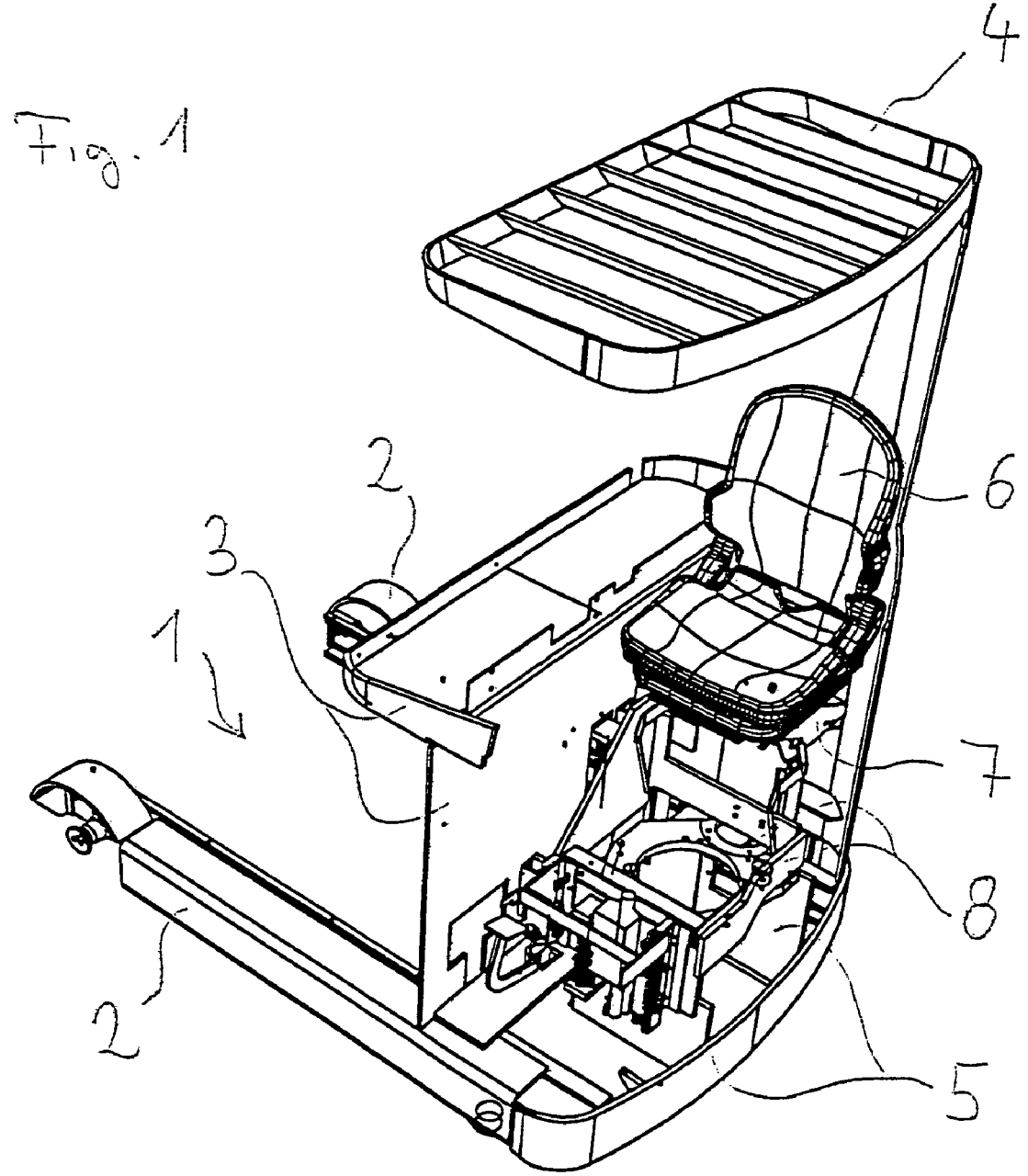
FIG. 1 shows the vehicle frame of an industrial truck of the invention.

FIG. 1 shows the vehicle frame 1 of an exemplary industrial truck of the invention having two wheel arms 2, a battery block holder 3, a roof 4 to protect the driver, and a driver's position segment 5. In the vicinity of the driver's position segment 5 of the vehicle frame 1 there is a driver's seat 6, which is fastened by means of an adjustment device 7 to an intermediate frame 8. The intermediate frame 8 is guided in the vertical direction on the vehicle frame 1 and is supported by means of damping and suspension elements on the vehicle frame 1.

Figure 2:
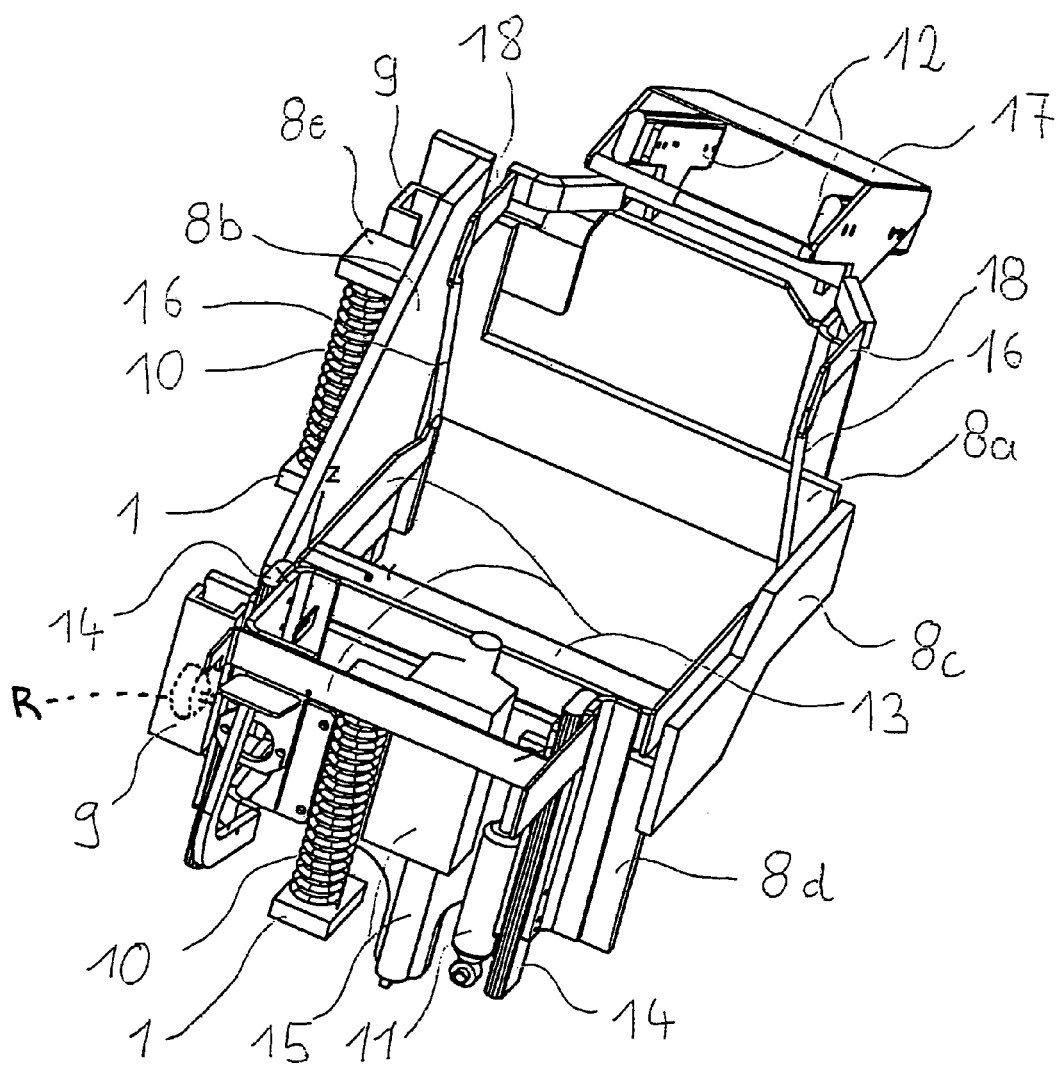
FIG. 2 shows, in a perspective view, the intermediate frame with guide, damping, and suspension elements and an adjustment device for a driver's seat.

FIG. 2 shows the intermediate frame 8, which includes a rear segment 8a, a right side segment 8b, a left side segment 8c, and a partly covered front segment 8d. The intermediate frame 8 is guided by means of three translation guide elements 9, two of which are visible in FIG. 2, so that it can move in the vertical direction relative to the vehicle frame 1. Each guide element 9 can include a U-shaped profile that is firmly connected with the vehicle frame 1 and at least one guide roller schematically shown at R that is guided in it and mounted on the intermediate frame 8. Impacts that act on the vehicle frame in the direction of the movement allowed by the guide elements 9 are attenuated or damped by means of two suspension elements 10 that can be realized in the form of metal coil springs and by means of a damping element 11 that can be realized in the form of a hydraulic shock absorber. The suspension elements 10 are supported with their upper end on components 8e that belong to the intermediate frame 8 and with their lower end on the vehicle frame 1. The damping element 11 is mounted on the piston-rod side on the front segment 8d of the intermediate frame 8 and on the cylinder-tube side on the vehicle frame 1.

Fastened to the intermediate frame 8 are two linear guides 12, with which a fastening plate 17 for a driver's seat (No. 6 in FIG. 1) is guided so that it can move relative to the intermediate frame 8. In the front area of the intermediate frame 8, a support structure 13 for a floor plate (not shown) of the driver's station is fastened to the intermediate frame 8 so that it can move in the vertical direction. This support structure 13 is guided by means of two linear guides 14 that are fastened to the intermediate frame 8. The force required for the vertical adjustment of the support structure 13 of the floor plate is generated by means of an electrical actuator 15 which is supported on one hand on the intermediate frame 8 and on the other hand on the support structure 13. The adjustment movement of the fastening plate 17 of the driver's seat (No. 6, FIG. 1) is forcibly coupled to the adjustment movement of the support structure 13 of the floor plate. For this purpose there are two pressure-loaded toggle links 16 which connect the support structure 13 with two arms 18 which are rigidly connected with the fastening plate 17. Thus, a vertical movement of the support structure 13 is transmitted to the fastening plate 17, which is thereby displaced along the guides 12.

Figure 3:
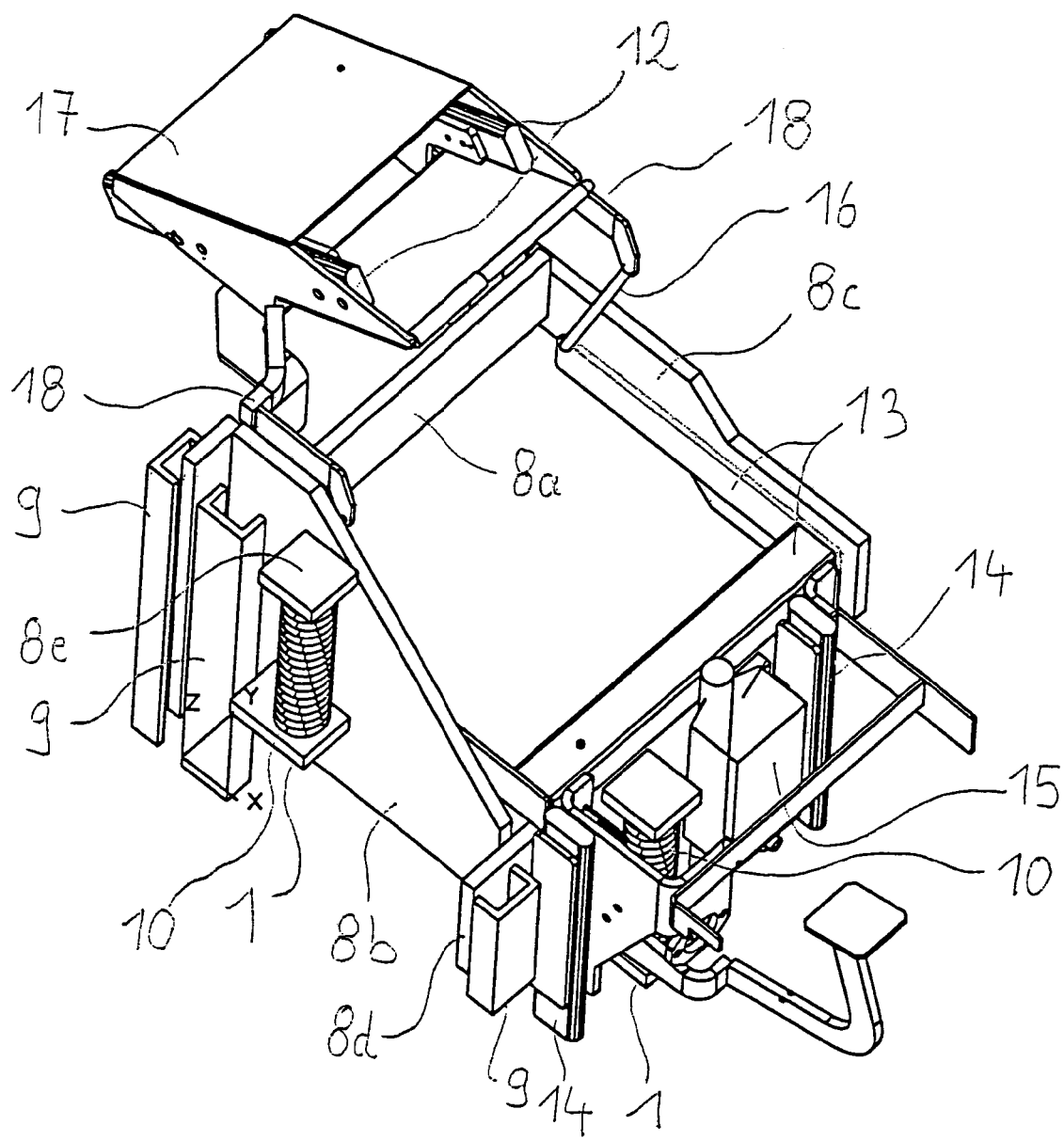
FIG. 3 shows, in another view, the intermediate frame with guide, damping, and suspension elements and an adjustment device for a driver's seat.

FIG. 3 shows another view of the arrangement illustrated in FIG. 2. This figure shows in particular the three guide elements 9 by means of which the intermediate frame 8 is guided in the vertical direction on the vehicle frame 1.

This damped and suspended mounting results in a significant improvement of the ergonomic conditions in the driver's position of the industrial truck. The acceleration forces in the vertical direction that act on the driver can be significantly reduced in comparison to those experienced on a conventional industrial truck. This result is also achieved in particular by the fact that the floor plate, together with the driver's seat, is fastened to the suspended and damped intermediate frame.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An industrial truck, comprising:
   a vehicle frame;
   a driver's station comprising at least one support structure for a floor plate and at least one driver's seat;
   an intermediate frame located at the driver's station, wherein the at least one support structure for a floor plate and the at least one driver's seat are fastened to the intermediate frame;
   at least one suspension element comprising at least one metal coil spring and at least one damping element comprising at least one hydraulic damper and separate from the suspension element, connecting the intermediate frame with the vehicle frame with one end of the suspension element connected to the intermediate frame and the other end of the suspension element connected to the vehicle frame, and with one end of the damping element connected to the intermediate frame and the other end of the damping element connected to the vehicle frame; and
   at least one translation guide element connecting the intermediate frame with the vehicle frame, wherein the translation guide element comprises at least one roller guided in the guide element such that the intermediate frame is movable in translation relative to the vehicle frame in only a vertical direction.

2. The industrial truck as claimed in claim 1, wherein a position of the driver's seat and of the at least one support structure for a floor plate is adjustable relative to the intermediate frame.

3. The industrial truck as claimed in claim 1, wherein the position of the driver's seat and of the at least one support structure for a floor plate relative to the intermediate frame is adjustable such that an adjustment of the height of the at least one support structure for a floor plate is coupled to a displacement of the driver's seat.

4. The industrial truck as claimed in claim 1, wherein the at least one suspension element and the at least one damping element are configured so that a vibration movement of the intermediate frame relative to the vehicle frame has a natural frequency between 2 and 3 Hz.

5. The industrial truck as claimed in claim 1, wherein the at least one suspension element and the at least one damping element are configured so that an oscillation movement of the intermediate frame relative to the vehicle frame has essentially decayed after two oscillation periods.

6. The industrial truck as claimed in claim 1, wherein for an oscillation movement of the intermediate frame, a maximum amplitude is provided that has a value between 2 and 6 cm.

7. The industrial truck as claimed in claim 1, wherein the industrial truck has an unsuspended chassis.

8. The industrial truck as claimed in claim 1, wherein the industrial truck is a reach truck.

* * * * *